United States Patent Office 3,126,298
Patented Mar. 24, 1964

3,126,298
METHOD OF COATING WITH A COMPOSITION COMPRISING A POLYEPOXIDE AND A PARTIAL FATTY ESTER OF A POLYOL
Charles T. Patrick, Jr., and Charles W. McGary, Jr., South Charleston, and Paul S. Starcher and Benjamin Phillips, Charleston, W. Va., assignors to Union Carbide Corporation, a corporation of New York
No Drawing. Filed June 3, 1959, Ser. No. 817,718
2 Claims. (Cl. 117—161)

This invention relates to compositions comprising polymerizable compositions, partially cured and cured resinous compositions derived from polyols and epoxyalicyclic compounds. In a particular aspect, this invention is directed to compositions based on polyols and cyclohexene oxide derivatives which have been found to be especially adapted for use as varnish coatings, and to methods for their preparation.

One of the largest outlets in the coatings field for conventional epoxy resins is in ester or varnish-type coatings. In these materials the epoxy resin is used as a high molecular weight polyol and is esterified with various fatty acids. Conventional epoxy resins are generally polymeric polyglycidyl ethers of polyhydric phenols. Polyepoxides of this type usually have molecular weights ranging from about 1000 to 8000. Esterification presumably occurs at both epoxide and hydroxyl sites. Esterification of hydroxyl groups is the major reaction since epoxy groups are only present in small quantity. Esterification of the hydroxyl groups with fatty acids requires fairly vigorous conditions, i.e., a temperature in the range between 230° C. and 260° C. and many unsaturated fatty acids, such as tung oil acid, form gels under these conditions.

Drying-oil esters based on the commercial epoxides employed as protective coatings have found wide acceptance due to their outstanding caustic and water resistance, and toughness and flexibility as compared to other drying oil compositions employed as protective coatings. These coatings, however, have been limited to certain areas of application due to various disadvantages such as poor color retention on exposure to ultraviolet light, severe chalking on exposure to outdoor conditions, poor solubility in inexpensive solvents, and relatively high cost.

Accordingly, one or more of the following objects will be achieved by the practice of this invention.

It is a main object of this invention to provide materials especially adapted for protective coating applications based on novel epoxy-polyol compositions containing long-chain aliphatic substituents, and methods for their preparation.

It is another object of this invention to provide novel drying and non-drying epoxy-polyol compositions which have excellent color retention in ultraviolet light and solubility in inexpensive solvents, and which do not exhibit various disadvantages of compositions based on conventional epoxy resins.

Other objects and advantages of this invention will become apparent to one skilled in the art from the accompanying description and disclosure.

One or more objects of this invention are accomplished by polymerizing compositions comprising (1) a polyepoxide containing at least two cyclohexene oxide groups, and (2) a polyol in an amount providing between about 0.8 and 1.5 hydroxyl equivalents per epoxy equivalent of said polyepoxide, said polyol corresponding to the formula $$(A)_x\text{—}R°\cdot(OH)_n$$

wherein A is an aliphatic radical containing between eight and thirty-six carbon atoms; R° is selected from polyvalent aliphatic, alicyclic and aromatic radicals; $x$ is a positive integer between 1 and 10, and $n$ is a positive integer between 2 and 5. The valency of R° is equal to $x+n$. R° is preferably selected from aliphatic and alicyclic radicals containing between about three and sixty carbon atoms. The A radicals can be joined to R° through oxygen, sulfur, nitrogen and other such linkages, besides carbon, as are found in ester, ether, thioether, amine, amide and other similar functional groups. The A radicals are further characterized as having a minimum chain length of at least eight carbon atoms, e.g., n-octadecyl and 2-ethyloctyl radicals.

The partially cured and cured resinous compositions of this invention useful as protective coatings are derived from the polymerizable compositions by the use of polymerization catalysts and the application of heat or other polymerization conditions hereinafter more fully described.

By the term "cyclohexene oxide" is meant a group corresponding to the structure

By the term "epoxy equivalent" as used herein is meant the number of epoxy groups

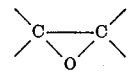

contained in a mole of epoxide compound. For example, one mole of 3,4-epoxy-6-methylcyclohexylmethyl 3,4-epoxy-6-methylcyclohexanecarboxylate contains two epoxy equivalents.

By the term "hydroxyl equivalent" as used herein is meant the number of hydroxyl groups contained in a mole of polyol. For example, there are two hydroxyl equivalents in one mole of a fatty acid diester derivative of 3,4-epoxy-6-methylcyclohexylmethyl 3,4-epoxy-6-methylcyclohexanecarboxylate,

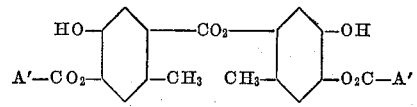

By the term "oxirane oxygen" is meant the oxygen contained as an epoxy group.

By the term "milliequivalent" is meant one thousandth part of the above-defined "equivalent" quantity.

The term "fatty" as used herein refers to compounds containing long-chain aliphatic radicals having at least an eight carbon chain length moiety, e.g., the aliphatic moiety of dehydrated castor oil acid or oleyl alcohol.

The compositions of this invention can contain elements comprising nitrogen, silicon, phosphorus, sulfur and halogen in addition to carbon, hydrogen and oxygen.

Among the polymerizable compositions of this invention having outstanding utility for the preparation of coating are those comprising (1) a polyepoxide corresponding to the general formula

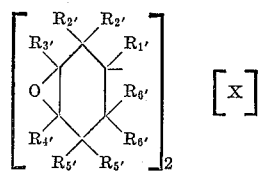

wherein X represents divalent radicals selected from the group consisting of

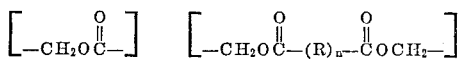

and

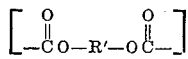

wherein R represents a member selected from the group consisting of aliphatic and aromatic radicals, $n$ is a positive integer selected from 0 and 1, R' represents an aliphatic radical, and $R_{1'}$ through $R_{6'}$ are members selected from the group consisting of hydrogen and aliphatic radicals, and (2) a polyol in an amount providing between 0.8 and 1.5 hydroxyl equivalents per epoxy equivalent of said polyepoxide, said polyol corresponding to the formula $$(A)_x - R° \cdot (OH)_2$$

wherein A is an aliphatic radical containing between eight and thirty-six carbon atoms; R° is selected from polyvalent aliphatic, alicyclic and aromatic radicals containing between three and about one hundred carbon atoms; and $x$ is a positive integer between 1 and 10. R° is preferably selected from aliphatic and alicyclic radicals containing between about three and sixty carbon atoms.

A preferred class of polyepoxides characterized by the above general formula which are contemplated for use in preparing the novel compositions of this invention are the 3,4 - epoxycyclohexylmethyl 3,4 - epoxycyclohexanecarboxylates which have the formula

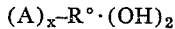
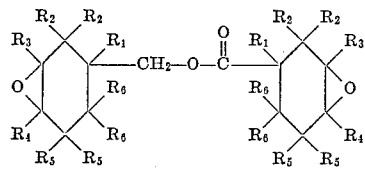

wherein $R_1$ through $R_6$ represent a hydrogen atom or a lower alkyl radical containing between one and four carbon atoms, and includes 3,4-epoxycyclohexylmethyl 3,4-epoxycyclohexanecarboxylate, 3,4 - epoxy - 1 - methylcyclohexylmethyl 3,4 - epoxy - 1 - methylcyclohexanecarboxylate; 3,4 - epoxy - 2 - methylcyclohexylmethyl 3,4-epoxy - 2 - methylcyclohexanecarboxylate; 3,4-epoxy-6-methylcyclohexylmethyl 3,4-epoxy - 6 - methylcyclohexanecarboxylate; 3,4-epoxy - 3 - methylcyclohexylmethyl 3,4-epoxy - 3 - propylcyclohexanecarboxylate; 3,4-epoxy-4-methylcyclohexylmethyl 3,4-epoxy-4-methylcyclohexanecarboxylate; 3,4 - epoxy-1-methylcyclohexylmethyl 3,4-epoxy - 5 - ethylcyclohexanecarboxylate, and the like.

Another preferred class of polyepoxides contemplated for use in preparing the noxel compositions of this invention are dihydric alcohol bis(3,4 - epoxycyclohexancarboxylates) which correspond to the formula

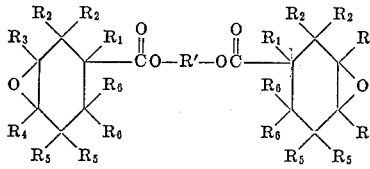

wherein $R_1$ through $R_6$ represent a hydrogen atom or a lower alkyl radical containing between one and four carbon atoms, and R' represents an aliphatic radical containing between two and about thirty-six carbon atoms.

The term "aliphatic" radical as represented by R' is meant to include structures which are derived from polyethylene glycols having the formula

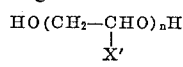

wherein X' represents a member selected from the group consisting of hydrogen and methyl groups and $n$ represents a positive integer in the range of from 2 through 10. Illustrative of the preferred class of polyepoxides are ethylene glycol bis(3,4-epoxycyclohexanecarboxylate); 2-ethyl - 1,3 - hexanediol bis(3,4-epoxycyclohexanecarboxylate); diethylene glycol bis(3,4-epoxy-6-methylcyclohexanecarboxylate); 3-methyl - 1,5 - pentanediol bis(3,4-epoxy-6-methylcyclohexanecarboxylate); 1,5 - pentanediol bis(3,4-epoxy - 1 - methylcyclohexanecarboxylate); tripropylene glycol bis(3,4-epoxy - 2 - ethylcyclohexanecarboxylate); 1,6 - hexanediol bis(3,4 - epoxycyclohexanecarboxylate); 1,2-eicosanediol bis(3,4-epoxycyclohexanecarboxylate), and the like.

Another preferred class of polyepoxides contemplated for use in preparing the novel compositions of this invention are the bis(3,4 - epoxycyclohexylmethyl)dicarboxylate corresponding to the formula

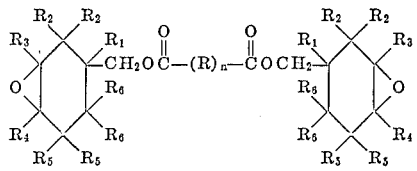

wherein $R_1$ through $R_6$ represent a hydrogen atom or a lower alkyl radical containing between one and four carbon atoms, R represents a member selected from the group consisting of divalent aliphatic radicals containing between one and about thirty-six carbon atoms and aromatic hydrocarbon radicals containing between six and about twenty carbon atoms, and $n$ is 0 or 1. Illustrative of this group of polyepoxides are bis(3,4-epoxycyclohexylmethyl) maleate; bis(3,4-epoxycyclohexylmethyl) pimelate; bis(3,4 - epoxy-6-methylcyclohexylmethyl) maleate; bis(3,4 - epoxy - 6 - methylcyclohexylmethyl) succinate; bis(3,4-epoxy - 6 - propylcyclohexylmethyl) sebacate; bis(3,4-epoxy - 4 - methylcyclohexylmethyl) 1,2-octadecanedicarboxylate; bis(3,4 - epoxycyclohexylmethyl) terephthalate; bis(3,4-epoxy - 1 - butylcyclohexylmethyl) 1,4-naphthalenedicarboxylate, and the like.

The polyepoxide starting materials are readily prepared by epoxidation of the corresponding olefinic derivatives. Preferred classes of polyepoxide starting materials and methods for their preparation are described in detail in United States Patents Nos. 2,716,123, 2,745,847 and 2,750,395.

In another embodiment of this invention valuable polymerizable compositions, and polymerized compositions produced therefrom, can be prepared according to the methods of the instant invention by the use of polyepoxide starting materials containing three cyclohexene oxide groups or four cyclohexene oxide groups, in compositions with the herein defined polyols. One preferred class of polyepoxides containing three cyclohexene oxide groups is that characterized by the formula

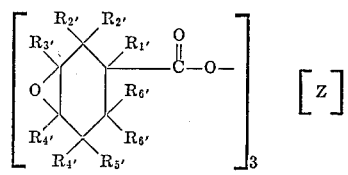

wherein $R_{1'}$ through $R_{6'}$ represent hydrogen or aliphatic radicals, and Z is a trivalent aliphatic radical. Illustrative of these preferred polyepoxides are the compounds corresponding to the esters of 3,4-epoxycyclohexanecarboxylic acids with trihydric alcohols such as glycerol, 1,2,6-hexanetriol, 1,1,1-trimethylolpropane, trimethylolmethane, and the like. Suitable polyepoxides containing three cyclohexene oxide groups and methods for their preparation are disclosed in United States Patent No. 2,857,402 to Phillips and Starcher.

One preferred class of polyepoxides containing four cyclohexene oxide groups is that characterized by the formula

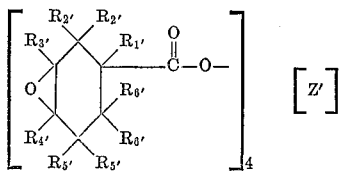

wherein $R_{1'}$ through $R_{6'}$ represent hydrogen or aliphatic radicals, and $Z'$ is a tetravalent aliphatic radical. Representative tetravalent aliphatic radicals as characterized by $Z'$ include groups which may be regarded as being the residue of tetrahydric (alcohols) without the hydroxyl groups. Examples of such tetrahydric (alcohols) include aliphatic tetraols such as erythritol, pentaerythritol, 1,2,3,4-tetrahydroxypentane, 1,2,3,5-tetrahydroxypentane, 1,2,5,6 - tetrahydroxyhexane, 2,3,4,5-tetrahydroxyhexane, 1,3,4,5-tetrahydroxyhexane, 1,3,4,6 - tetrahydroxyhexane, 1,2,7,8-tetrahydroxyoctane, 2,5 - dimethyl-2,3,4,5-tetrahydroxyhexane, 1,2,4,5 - tetrahydroxycyclohexane, 1,2,4,5-tetrahydroxycyclohexane, 1,2,5,6 - tetrahydroxycyclooctane, 1,2,3,4-tetrahydroxycyclopentane, 9,10,12,13-tetrahydroxyoctadecanoic acid, and the like.

The polyepoxides containing four cyclohexene oxide groups corresponding to the above formula can be prepared by treating a tetraol tetrakis(3-cyclohexenecarboxylate) starting material with an epoxidizing agent. The tetraol tetrakis(3-cyclohexenecarboxylate) starting materials can be prepared in accordance with known procedures by condensing a 3-cyclohexenecarboxylic acid with an organic tetraol. The various organic tetraols and polyols which may be used to prepare the starting materials include aliphatic polyols, such as erythritol, threitol, pentaerythritol, 1,2,3,4-tetrahydroxypentane, and the other tetraols mentioned above. Suitable polyepoxides containing four cyclohexene oxide groups and methods for their preparation are disclosed in co-pending patent application by S. W. Tinsley and P. S. Starcher, Serial No. 762,238, filed September 22, 1958, entitled "Tetraepoxides and Polyepoxides," now abandoned.

The preferred polyepoxide starting materials useful for combination with polyols for the preparation of the compositions of this invention are more generally characterized by the formula

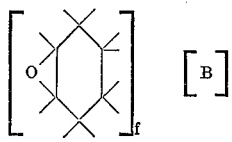

wherein B is a polyvalent organic radical containing between one and about forty carbon atoms and $f$ is an integer which has a value of at least 2 and not more than about 8. Besides the classes of polyepoxides disclosed hereinbefore, other preferred polyepoxides corresponding to the above general formula include carbonate epoxy esters such as 3,4-epoxycyclohexylmethyl carbonate, and the like; epoxy ethers of glycols and alkylene glycols such as 3,4-epoxycyclohexylmethyl ethers of ethylene glycol, 3,4-epoxy-6-methylcyclohexylmethyl ethers of polyethylene glycol and polypropylene glycol, and the like; and other derivatives such as 1,2-bis(3,4-epoxy - 1 - chlorocyclohexyl) ethane, 1,4-bis(3,4-epoxycyclohexylmethyl)-benzene, and the like. Still other useful polyepoxides are cyclohexene oxide-containing spirobi(meta-dioxane) derivatives such as 3,9-bis(3,4 - epoxycyclohexyl)spirobi-(meta-dioxane), and the like.

The methods of the instant invention are also applicable to various other interesting alicyclic oxide derivatives such as vinylcyclohexene dioxide, dicyclopentadiene dioxide, di(2,3-epoxycyclopentyl) ether, ethylene glycol bis(3-oxatetracyclo[4.4.1⁷,¹⁰.0¹,⁶.0²,⁴]undecyl - 8 - ether), and the like, for the production of resins with a variety of desirable properties.

As mentioned previously, the polyols which can be combined with the hereinbefore described polyepoxides to produce valuable, resinous materials according to this invention are the broad class of polyhydric compounds corresponding to the general formula $$(A)_x - R° \cdot (OH)_n$$

The polyols include both polyhydric alcohols and polyhydric phenols. The polyhydric alcohols are preferred since the presence of phenolic nuclei in compositions is known to adversely affect color stability on exposure to ultraviolet light. The preferred polyols are characterized as having the hydroxyl groups on different carbon atoms, and the respective carbon atoms have the remaining valences satisfied by linkages with hydrogen or other carbon atoms. Primary and secondary hydroxyl groups are preferred to tertiary hydroxyl groups. The tertiary hydroxyl groups have low reactivity with oxirane oxygen groups and have the further disadvantage of being susceptible to dehydration to form olefins.

One preferred class of polyols corresponding to the general formula are partial esters of polyhydric alcohols. These hydroxy esters contain at least two free hydroxyl groups. They are prepared by the partial esterification of polyhydric alcohols with fatty acids. Typical polyhydric alcohols include glycerol, diglycerol, trimethylolmethane, 1,1,2-trimethylolethane, 1,1,1-trimethylolpropane, trimethylolphenol, 1,2,6-hexanetriol, pentaerythritol, dipentaerythritol, pentaglycerol, lower polyvinyl alcohols, sorbitol, mannitol and other sugars, and the like. Suitable fatty acids generally correspond to those listed hereinafter. The partial esters of pentaerythritol and glycerol are illustrative of this class of polyols

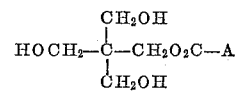

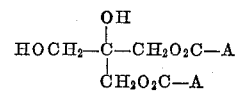

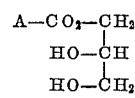

wherein A is an aliphatic radical containing between eight and thirty-six carbon atoms. In the preparation of these partial esters, the molar ratio of the polyol and fatty acid is adjusted to permit the desired number of hydroxyl groups to remain unreacted.

Another preferred class of polyols corresponding to the general formula are those containing one or more alicyclic ring structures and two alcoholic hydroxyl groups, and no elements other than carbon, hydrogen, oxygen, nitrogen, sulfur or halogen. Among the most useful of the polyols are those derived from the interaction of a suitable epoxide with active hydrogen compounds such as fatty alcohols and fatty acids, and the corresponding sulfur and nitrogen derivatives, e.g., thio, amino, amido and the like, of the fatty compounds. Particularly preferred polyols of this type are those containing at least one

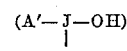

radical wherein J is a five-membered or six-membered alicyclic structure, $A'$ is a member selected from the group consisting of (A—O—) and (A—CO₂—), and A is an aliphatic radical containing between eight and thirty-six carbon atoms.

One particularly preferred class of alicyclic polyols are those corresponding to the formula

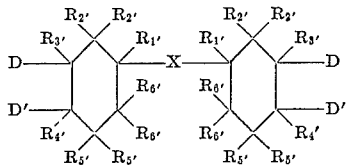

wherein X and $R_{1'}$ through $R_{6'}$ are as defined earlier, wherein D and D' are members selected from the group consisting of (—OH) and (—A') radicals with the proviso that one of said D and D' is (—OH) and the other is (—A') on each ring, respectively, wherein A' is a member selected from the group consisting of (A—O—) and (A—CO$_2$—), and A is an aliphatic radical containing between eight and thirty-six carbon atoms. These preferred polyols are readily prepared by the interaction of fatty alcohols and fatty acids with suitable diepoxides such as 3,4-epoxycyclohexylmethyl 3,4-epoxycyclohexanecarboxylate, tripropylene glycol bis(3,4-expoxycyclohexanecarboxylate), bis(3,4-epoxycyclohexylmethyl) terephthalate, and the like. Typical fatty acids which can be employed are aliphatic monocarboxylic acids such as hexanoic acid, caprylic acid, lauric acid, capric acid, myristic acid, palmitic acid, stearic acid, arachidic acid, palmitoleic acid, oleic acid, linolec acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseeed oil, oiticica oil, perilla oil, olive oil, safflower oil, sardine oil, soybean oil, tall oil, tung oil (China-wood oil), and the like. Typical fatty alcohols which can be employed include, n-octyl alcohol, n-decyl alcohol, stearyl alcohol, cetyl alcohol, behenyl alcohol, lignoceryl alcohol, lauroleyl alcohol, myristoleyl acohol, palmitoleyl alcohol, oleyl alcohol, gadoleyl alcohol, erucyl alcohol, linoleyl alcohol, linolenyl alcohol, elaeostearyl alcohol, ricinoleyl alcohol, arachidonyl alcohol, clupanodonyl alcohol, and the like, and mixtures of the alcohols.

Another particularly preferred class of alicyclic polyols are those corresponding to the formula

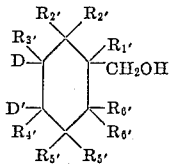

wherein D, D' and $R_{1'}$ through $R_{6'}$ are as previously defined herein. These preferred diols are readily prepared by the interaction of fatty alcohols and fatty acids, as described above, with a suitable epoxy alcohol such as 3,4-epoxycyclohexylmethanol.

The above-described polyols derived from the interaction of a monocarboxylic fatty acid or monohydric fatty alcohol with a suitable alicyclic epoxide are prepared by heating the reactants together in specific proportions at a temperature between about 25° C. and 250° C. for a reaction period which can vary from several minutes to several days depending on such factors as the reaction temperature, the concentrations and reactivities of the reactants, and the presence or absence of a catalyst. Most of the reactions will proceed to completion at a temperature between about 100° C. and 220° C. in a reaction time between about 0.5 and 10 hours. Various acids and bases can be employed to catalyze the reactions. The use of a catalyst is usually necessary in the case of the fatty alcohol-epoxide reaction, but is generally not necessary for the fatty acid-epoxide reaction. The catalyst is used in a quantity between about 0.005 and 5 weight percent based on the total weight of the fatty acid, or fatty alcohol, and alicyclic epoxide reactants. Suitable catalysts include acids such as sulfuric acid, alkanesulfonic acids, benzenesulfonic acid, toluenesulfonic acid, phosphoric acid, polyphosphoric acid, dimethyldihydrogenpyrophosphate, and the like; bases such as sodium hydroxide, sodium alcoholates, and the like; quaternary ammonium compounds such as benzyltrimethylammonium hydroxide, tetramethylammonium hydroxide, and the like; and tertiary amines such as alpha-methylbenzyldimethylamine, pyridine, triethylamine, dimethylaminomethylphenol, 2,4,6-tris(dimethylaminomethyl)phenol, and the like.

The proportions of epoxide and monofunctional fatty acid or fatty alcohol interacted are conveniently expressed in terms of carboxyl equivalents of the fatty acid or hydroxyl equivalents of the fatty alcohol per epoxide equivalent of the epoxide. A suitable ratio is in the range between about 0.5 and 1.5 carboxyl equivalents or hydroxyl equivalents per epoxide equivalent, and the preferred ratio is between about 0.8 and 1.2 carboxyl equivalents or hydroxyl equivalents per epoxide equivalent. Theoretically, in the case where the epoxide being reacted is a diepoxide, 1.0 carboxyl equivalent or hydroxyl equivalent per epoxide equivalent should afford desirable fatty diol product. The fatty diol products so produced are generally characterized as having less than 0.3 milliequivalent of epoxide per gram of fatty diol product.

If desired, a solvent may be used as a medium for the fatty acid or fatty alcohol and epoxide interaction to facilitate stirring, to control reaction temperature and the rate of reaction, and the like. Suitable solvents include aromatic hydrocarbons, e.g., benzene, toluene, xylene, and the like; aliphatic hydrocarbons, e.g., hexane, heptane, terpene solvents, cyclohexane, and the like; oxygenated solvents, e.g., ethyl acetate, butyl acetate, amyl acetate, acetone, methyl ethyl ketone, methyl isobutyl ketone, cyclohexanone, tetrahydrofuran, Cellosolve, methyl Cellosolve, dioxane, diisopropyl ether, and the like; and other common solvents. The fatty polyl product mixtures can be employed in applications without purification or modification. If desired, separation of a fatty polyol product mixture into its component parts can be accomplished by distillation.

Other epoxy-alcohols useful for preparing diol-fatty esters or diol-fatty ethers include glycidol, 2,3-epoxycyclopentanol, 2,3-epoxy-2-ethylhexanol, and the like.

The polymerizable compositions of this invention can be converted to partially cured and cured resinous materials without benefit of a polymerization catalyst. However, it is advantageous to employ a catalyst for purposes of convenience and to obtain optimum results. The quantity of catalyst employed can vary in the range between about 0.005 and 15 weight percent based on the total weight of the polymerizable material in a composition, with between about 0.01 and 10 weight percent being the preferred weight range. Suitable polymerization catalysts include acids such as sulfuric acid, alkanesulfonic acids, benzenesulfonic acid, perchloric acid, phosphoric acids, and the like; metal halide Lewis acids and their complexes, such as stannic chloride, stannic bromide, ferric chloride, aluminum chloride, zinc chloride, boron trifluoride, boron trifluoride-ether complexes, boron trifluoride amine complexes, e.g., boron trifluoride-monoethylamine complex, boron trifluoridepiperidine complex, and the like; bases such as sodium hydroxide, alkali metal alcoholates, tertiary amines, e.g., benzyldimethylamine, dimethylaminomethylphenol, 2,4,6 - tri(dimethylaminomethyl)phenol, and the like; alkyl titanates such as tetraisopropyl titanate, tetrabutyl titanate, and the like; and other similar catalysts having curing activity. Preferred catalysts are the acidic catalysts and the alkyl titanates. The particularly preferred catalysts from this group include stannic chloride, stannic bromide, boron trifluoride-etherate, boron trifluoride-amine complexes, metal fluoborates, e.g., zinc fluoborate, copper fluoborate and lead fluoborate, and tetraalkyl titanates, e.g., tetraisopropyl titanate and tetrabutyl titanate.

The polymerizable compositions comprising a polyepoxide and a polyol can be prepared by the simple expediency of mixing together the composition components at room temperature. The polymerizable compositions can be prepared at the time that they are to be utilized or they can be prepared and stored for future application. The incorporation of a catalyst into the polymerizable compositions can be facilitated if desired by preparing a catalyst solution with a suitable solvent such as xylene, ethyl acetate, heptane, dioxane, ethyl ether, and the like. Small quantities of water can be used as a solvent with most of the catalysts with the exception of those which decompose in water, e.g., aluminum chloride.

The polymerization of the polymerizable compositions occurs readily with or without a solvent at a temperature in the range between about 25° C. and 200° C. The polymerization time can vary over a wide range from several minutes to several days depending on such factors as the nature of the polyepoxide and polyol, the quantity and reactivity of the catalyst if present, the absence or presence of a solvent, and the like. It is advantageous to perform the polymerization in a solvent or solvent mixture. Suitable solvents include hydrocarbons such as benzene, xylene, toluene, hexane, heptane, octane, cyclohexene and various terpenes; oxygenated solvents such as acetone, methylisobutyl-ketone, cyclohexanone, ethyl acetate, butyl acetate, amyl acetate, dioxane, tetrahydrofuran, dibutyl ether, and the like; and other common solvents such as carbon tetrachloride, carbon disulfide, and the like. The progress of the polymerization reaction can be observed by determining the relative viscosity of samples drawn from the reaction mixture. In this manner it is possible to produce partially polymerized compositions or completely polymerized compositions. The presence of solvent permits the maintenance of adequate stirring, and it provides a medium for applying the product resinous material in coatings and other applications.

While not wishing to be held to any particular theory or mechanism of reaction, it is believed that during the curing or polymerization reaction the polyepoxide and polyol components of the polymerizable compositions copolymerize to form resinous materials having structures similar to those illustrated in the following reaction scheme:

desired by adding one of the reactive components dropwise to the other reactive component which is maintained under reaction conditions. The hardness and resistance to solvents and chemicals of the resinous materials are increased as the degree of cross-linking is increased.

In another embodiment of this invention, valuable resinous copolymers useful for protective coatings can be prepared by esterifying with fatty acids the resins prepared by the copolymerization of the polyepoxides of this invention with polyols not containing long-chain aliphatic, i.e., fatty substituents, selected from the group consisting of polyhydric alcohols and polyhydric phenols, where the hydroxy groups and epoxide groups are in a ratio of from 0.8 to 1.5 hydroxyl groups per epoxide group. The resins obtained by this modification method have properties and utility similar to the copolymers described hereinbefore. The modification of resins by esterification with fatty acids of residual hydroxyl groups contained in the resins has general applicability in the practice of this invention. Resins already containing long-chain aliphatic substituents can also be modified by this method to increase the number of long-chain fatty substituents contained in the resins. Hence, the fatty acid esterification of resins is useful for either introducing fatty chains into resins not containing any fatty substituents, or for increasing the number of fatty substituents in resins already containing this type of substituent. The modification effected is directly dependent on the number and position of the available hydroxyl groups in the respective resins. In any given resin, either substantially all of the free hydroxyl groups can be esterified or just a portion of them by adjustment of the equivalent weight ratio of fatty acid and resin.

The esterification of the resins with fatty acids can be accomplished by heating the resin and fatty acid at a temperature between about 100° C. and 300° C. A solvent medium for the reaction can be employed if desired, such as dioxane, 1,2-dimethoxyethane, tetrahydrofuran, butyl acetate, cyclohexanone, xylene, toluene, and the like. The esterification proceeds more rapidly in the presence of a strong acid catalyst such as toluenesulfonic acid. Basic catalysts such as potassium hydroxide can also be used. Any of the well-known esterification catalysts can be employed such as, for example, triphenyl phosphite. It is advantageous to remove the water of reaction as it is formed. It is generally desirable to include

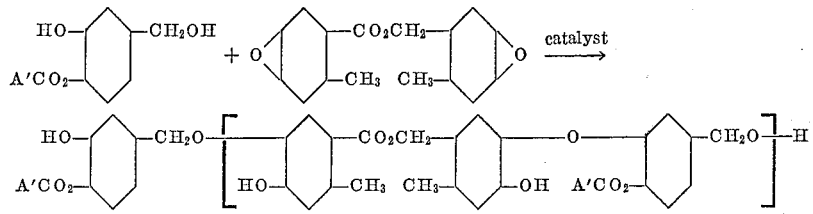

A variety of isomeric structures can be formed by the interaction of the polyepoxide and polyol, and it is to be expected that the resinous materials of this invention are complex mixtures. The epoxide groups are also capable of reacting with each other as well as with hydroxyl groups, and the generated hydroxyl groups are also capable of reaction with the epoxide groups. The compositions containing reactive components in addition to the polyepoxide and polyol will have even more complex polymer structures. These postulated reaction mechanisms are merely theoretical; other theories or reasons may equally well explain the true course of the curing reactions.

When polyepoxides and polyols are copolymerized which contain more than two epoxide groups and/or more than two hydroxyl groups per molecule, respectively, reaction conditions can be adjusted to control the amount of cross-linking which can occur. It has been found that cross-linking can be kept to a minimum when an azeotroping solvent such as xylene in the reaction mixture to facilitate the removal of water and to aid in the control of the reaction temperature.

Other methods can be employed for controlling the number of long-chain aliphatic substituents in the compositions of this invention. In one method, the number of long-chain aliphatic substituents in the fatty polyol component of the polymerizable compositions is varied. For example, either one or two of the hydroxyl groups of pentaerythritol are esterified. In another method, a mixture of polyols is employed as the polyol component of the polymerizable compositions, and the polyol mixture includes a variable amount of polyol not containing long-chain aliphatic substituents, i.e., non-fatty polyols. For example, such a polyol mixture is illustrated by a mixture of pentaerythritol and partially-esterified pentaerythritol. An increase in the amount of fatty polyol in a polyol mixture increases the number of fatty substituents ultimately incorporated in the polymerized materials produced from the respective polymerizable polyol-polyepoxide compositions containing a polyol mixture as the polyol component. In another method, the polyol component of the polymerizable compositions can be a polyol mixture prepared by the reaction of a fatty alcohol or a fatty acid with a polyepoxide; the ratio of reactants is varied so as to react a greater or lesser number of epoxide groups, thereby forming a variable number of hydroxyl groups and concomitantly introducing a variable number of fatty substituents in the said polyol mixture substantially equivalent to the number of hydroxyl groups formed by the interaction. The residual epoxy content of the polyol mixture preferably is maintained below about 0.3 milliequivalent per gram.

The polymerizable compositions of this invention are generally resinous liquids having viscosities in the range between 500 and 500,000 centipoises at 25° C. and are further characterized as ranging from pale yellow to dark amber in color. Other polyfunctional materials also may be incorporated into the polymerizable compositions. Such polyfunctional materials include other polyepoxides, e.g., polyglycidyl ethers of polyhydric phenols, and the like, urea-formaldehyde or phenol-formaldehyde polymers and the like. Many variations in the physical properties of the resin compositions can be obtained by employing such other polyfunctional materials in the polymerizable compositions of this invention.

Various modifiers such as monohydric alcohols, monoepoxides, polyepoxides, monocarboxylic acids, polycarboxylic acids, carboxylic acid anhydrides, amines, and the like, can be used to aid in the control of molecular weight or to alter resin properties.

The polymerized compositions of this invention are generally obtained as viscous solutions which have viscosities at 25° C. ranging from about 50 to 1,000,000 centipoises when measured as 50 percent solutions. The polymerized compositions fall into two general categories: (1) drying compositions, and (2) non-drying compositions. The drying compositions are those in which the long-chain aliphatic substituents contained in the resins are olefinically-unsaturated, e.g., the aliphatic moiety of dehydrated castor oil acid. The non-drying compositions are those in which the long-chain aliphatic substituents contained in the resins are saturated, e.g., the aliphatic moiety of octadecanoic acid.

Both the drying and non-drying polymer compositions are useful as modifiers for coating resins such as phenol-formaldehyde resins, melamine-formaldehyde resins, alkyl resins, and the like. The compositions are outstanding as modifiers because (1) they have a wide range of compatibility, (2) they impart improved caustic, water and chemical resistance to the resin coatings they are modifying, (3) they impart improved flexibility and toughness, and (4) they impart improved color stability to ultraviolet light exposure.

The drying polymer compositions of this invention are capable of "drying," or curing, to excellent protective coatings with or without the use of elevated temperatures. It is generally desirable to employ various metallic salts of organic compounds, which are known as driers, to accelerate the drying process. The drying can be accomplished at temperatures in the range between about 10° C. and 250° C. for a period of time sufficient to produce the desired properties in the resin. The drier compound is employed in a quantity between about 0.001 and 5.0 weight percent, based on the weight of polymer. Suitable driers include soluble compounds containing heavy metals, e.g., cobalt, lead, manganese, calcium, zinc, iron, and the like. Examples of such driers include cobalt naphthenate, lead octanoate, and the like.

It is often advantageous to treat the polymerized esters of this invention in various ways to give products which have viscosities which do not change (become lower) on aging. Both physical and chemical treatments have been found effective. For example, heating the polymerized products at 130° C. to 250° C. for from a few minutes to several hours serves to lower the product viscosity or change a gel-type structure to a free-flowing solution. Chemical treatments which serve to accomplish this same effect involve the addition of water, alcohols, acids, amines and the like to the polymerized products. Simultaneous treatment with heat and reactive compounds is often found advantageous.

It is believed that many of the polymerization catalysts utilized in the practice of this invention form both chemical and/or coordination bonds with the polymers formed to give products which are extremely viscous or are gel-type structures prior to treatment as described above. Catalysts producing such effects include stannic chloride, stannic bromide, boron trifluoride-ethyl ether complex and the like.

The resinous compositions of this invention can be applied to surfaces by dip-coating from a solution of the resinous compositions, or by spraying and other conventional means. The compositions can be applied as protective coatings to metal, glass, wood, plastic, and flexible materials such as nylon or fiber glass cloth. Finishes from the applied coatings are usually allowed to cure at temperatures between 20° C. and 200° C. for a period of time sufficient to effect the desirable degree of curing, e.g., between fifteen and thirty minutes at a temperature around 177° C.

The preferred resinous compositions of this invention form excellent protective coatings and have several advantages over commercial epoxy varnishes and similar materials based on conventional epoxy derivatvies. The improved coatings have excellent adhesion to a variety of substrates, and have excellent toughness, flexibility, caustic resistance, water resistance, chemical resistance, extreme hardness, and excellent color stability on exposure to ultraviolet light. The coatings derived from the compositions of this invention have Sward hardness values up to 90, while coatings from commercial drying-oil compositions have Sward values below about 60.

The resinous compositions display a wide range of compatibility with other resinous materials used in protective coatings. The resinous compositions have the further advantage of being soluble in inexpensive aliphatic solvents as compared to the low tolerance of commercial epoxy varnishes for such solvents.

The outstanding color stability of the resinous compositions is believed to be due to the use of polyepoxides free of phenolic nuclei which presumably form color bodies due to oxidation in the presence of heat or ultraviolet light.

This application is a continuation-in-part of application Serial No. 650,554, entitled "Compositions Comprising Epoxides and Polyols," by Benjamin Phillips, Paul S. Starcher, Charles W. McGary, Jr. and Charles T. Patrick, Jr., filed April 4, 1957, now United States Patent No. 2,890,195.

The following examples will serve to illustrate specific embodiments of this invention.

The polyepoxides were prepared from the corresponding polyolefins and peracetic acid using standard procedures. The ratios of polyepoxide and fatty acids and fatty alcohols used for preparing the fatty ester polyols and fatty ether polyols were based on epoxy equivalent weights as determined by analysis of the polyepoxide with pyridine hydrochloride. For example, a diepoxide having a theoretical molecular weight of 280 and which analyzes 95 percent pure would have an epoxy equivalent weight of $280 \div (2 \times 0.95) = 147$. Proportions expressed as percent (%) are in all cases weight percent.

The term "acid number" is defined as the number of milligrams of potassium hydroxide which are required to neutralize the free acid in a gram of substance. The "acid numbers" were determined by dissolving the sample for analysis in acetone and titrating with a standard alcoholic potassium hydroxide solution using phenolphthalein as the indicator. When a solvent was present with the reaction mixture being analyzed, the acid numbers reported were for the reaction mixture only and a correction was made so as not to include the solvent.

The epoxide-fatty acid adducts and epoxide-fatty alcohol adducts were prepared by reacting the polyepoxide and fatty acid or fatty alcohol in a round-bottomed flask fitted with an air stirrer, a thermometer, a nitrogen purge line, a water-cooled reflux condenser and being heated with an electric heating mantle. The reactions were followed by analysis for acid in the case of the fatty acid, and when the reactions were completed analysis for residual epoxide was carried out.

Copolymerization of the resulting adducts with polyepoxides was generally carried out in solution with solvent being added as the polymerization progressed in order to maintain adequate stirring. Polymerization was considered completed when the viscosity of the reaction mixture ceased to increase as determined relatively by drawing a sample of the polymer solution into a 10-milliliter pipette and observing with a stopwatch the time required for the sample to flow from the pipette.

After the polymerizations were completed the viscosities of the products were determined at room temperature using a Brookfield viscometer, Model LVF or Model LVT. Total solids present in the polymer solutions were determined by weighing about a one-gram sample of the solution into an aluminum weighing dish measuring about two inches in diameter, heating the open dish in a mechanically convected oven at 160° C. for about fifteen minutes, cooling it to room temperature and weighing the residue.

The evaluation of the various polymers as baked protective coatings generally involved the following procedure:

(1) The solution viscosity was adjusted by the addition of xylene to allow the preparation of films having a thickness of from 1.2 to 1.8 mils (thousandths of an inch).

(2) Cobalt naphthenate, 0.05 percent as cobalt, was then added to serve as a drier, unless another drier is specified.

(3) Films were applied by dipping parkerized steel panels with a Fisher-Payne Dip-Coater.

(4) The resulting coated panels were air-dried for fifteen to thirty minutes and subsequently baked for thirty minutes at 177° C.

(5) A coating which gave a dry film of 1.0 to 2.0 mils in thickness was also applied to a glass plate to be used for obtaining Sward hardness values.

(6) The resulting coatings were then tested for flexibility with a Parlin-Du Pont impact tester, results reported as in. lbs.

(7) Coated panels were tested in boiling water for one hour. The following ratings were used: Excellent—unaffected except for a slight loss of gloss at the air-water interface; good—some softening at the air-water interface; fair—definitely tacky at air-water interface.

(8) Coated panels were tested for caustic resistance by emersion in 20 percent sodium hydroxide for twenty-four hours at room temperature. The following ratings were used: Excellent—no change; good—very slight softening; fair—in addition to softening, some loss of gloss and adhesion was observed; poor—film was dissolved.

The dehydrated castor oil acid employed was a commercial fatty acid designated as Baker acid 9–11 (Baker Castor Oil Company, Bayonne, New Jersey). Commercial dehydrated castor oil acid has an approximate composition of 7 to 10 percent oleic acid, 76 to 88 percent linoleic acid and 3 to 8 percent ricinoleic acid, and an iodine number of 145–155 and an equivalent weight of 284–288. Tung oil acid has an approximate composition of 4 percent palmiitic acid, 1 percent stearic acid, 8 percent oleic acid, 4 percent linoleic acid, 3 percent linolenic acid and 80 percent eleostearic acid, and has an iodine number of 160–175. The approximate composition and constants of soya oil acid, tall oil acid and other commercial fatty acids are published in the chemical literature (e.g., "Epon Resin Esters," Technical Publication SC:54–46, Shell, pages 48 and 49).

EXAMPLE 1

3,4-epoxy-6-methylcyclohexylmethyl 3,4-epoxy-6-methylcyclohexanecarboxylate (154 grams) and dehydrated castor oil acid (203 grams) were mixed in the proportions of one epoxide group per 0.7 carboxyl group and reacted at a temperature of 160° C. to 183° C. for a period of six and one-half hours. The resulting product was characterized as follows:

Acid number_____ 3.7
Epoxide content, milliequivalents/gram_____ 0.14
Viscosity, centipoises at 25° C_____ 75,000

The product (270 grams), xylene (34 grams) and 3,4-epoxy-6-methylcyclohexylmethyl 3,4-epoxy-6-methylcyclohexanecarboxylate (88 grams) were mixed and heated to a temperature of 50° C. and there was added dropwise a catalyst solution comprising 0.9 gram of stannic chloride, 17.8 grams of ethyl acetate and 52 grams of xylene over a period of about thirty minutes. The polymerization temperature was maintained at 43° C. to 55° C. for three and one-half hours and then raised to 100° C. for one hour. Xylene was added as required in order to maintain the viscosity of the polymer solution at a stirrable level. The resulting polymer solution contained 36.4 percent as non-volatiles and had a viscosity of 1,600 centipoises at 25° C.

Parkerized black iron panels were dip-coated from the polymer solution to afford a dry film which was from 0.8 to 1.0 mil in thickness. The resulting coated panels were allowed to air-dry for thirty minutes at 25° C. and then they were baked for thirty minutes at 177° C. in an electrically heated oven.

| Impact, in. lbs. | Sward Hardness | Chemical Resistance | |
|---|---|---|---|
| | | Boiling Water | Caustic |
| 108 | 63 | Excellent | Fair. |

EXAMPLES 2 THROUGH 5

3,4-epoxy-6-methylcyclohexylmethyl 3,4-epoxy-6-methylcyclohexanecarboxylate (770 grams) of 91.5 percent purity and dehydrated castor oil acid (1000 grams) were mixed in the proportions of 0.7 carboxyl group per one epoxide group. The resulting mixture was heated to a temperature of 180° C. and maintained thereat for a period of about three hours. The resulting adduct product had a viscosity of 36,500 centipoises at 25° C., an acid number of 2.7, and contained 0.3 milliequivalent of epoxide per gram.

Four portions (154 grams, respectively) of the adduct product were charged to one-liter, round-bottomed flasks fitted with an air stirrer, a thermometer, a dropping funnel, and a water-cooled condenser. There was then added the various catalysts in the amounts indicated in Table I. The resulting reaction mixtures were heated to 100° C. and 46 grams of 3,4-epoxy-6-methylcyclohexylmethyl 3,4-epoxy-6-methylcyclohexanecarboxylate were added dropwise to each of the mixtures over a period of thirty to forty-five minutes. The resulting polymerization mixtures were then heated to 100° C. to 120° C. for the periods of time indicated in Table I. Xylene solvent was added to each mixture as the polymerizations progressed in order to maintain viscosities at a stirrable level. The properties of the resulting polymer solutions are described in Table I.

Table I

| Ex. No. | Catalyst | Grams | Percent[a] | Polymerization at 100-120° C., hours | Properties of polymer solution | |
|---|---|---|---|---|---|---|
| | | | | | Solids, percent | Viscosity, cps. at 26° C. |
| 2 | BF₃–MEA[b] | 1.0 | 0.65 | 10 | 78.8 | 13,500 |
| 3 | Perchloric acid | c 3.0 | 0.1 | 10 | 74.6 | 8,000 |
| 4 | Zinc fluoborate | d 0.75 | 0.2 | 6 | 63.9 | 450 |
| 5 | Tetraisopropyl titanate | 6.0 | 3.0 | 5.5 | 71.1 | 450 |

[a] Weight percent based on the total weight of diol and 3,4-epoxy-6-methylcyclohexylmethyl 3,4-epoxy-6-methylcyclohexanecarboxylate.
[b] Boron trifluoride-monoethylamine complex.
[c] Five percent solution in water.
[d] Forty percent solution in water.

EXAMPLE 6

Vinylcyclohexene dioxide (35 grams) and dehydrated castor oil acid (100 grams) were mixed in the proportions of one epoxide group per 0.7 carboxyl group. The resulting mixture was charged to a 500 milliliter 4-necked flask fitted with an air stirrer, a thermometer, a nitrogen purge line, and a water-cooled reflux condenser. The reaction mixture was then heated to a temperature of 185° C. to 195° C. with stirring and maintained thereat for 3.7 hours after which time the temperature was raised to 218° C. to 223° C. for a period of 1.7 hours. After cooling, the resulting pale-colored adduct product was characterized as follows:

Acid number _____ 5.1
Epoxide content, milliequivalents/gram _____ 0.28
Viscosity, centipoises at 25° C _____ 800

3,4-epoxy-6-methylcyclohexylmethyl 3,4-epoxy-6-methylcyclohexanecarboxylate (58 grams) was mixed with the adduct product (112 grams) and the resulting mixture was heated to a temperature of 50° C. and there was added dropwise a catalyst solution comprising 0.6 gram of stannic chloride, 11 grams of ethyl acetate and 50 grams of xylene. The catalyst solution was added over a period of thirty minutes during which time the slightly exothermic polymerization increased the reaction mixture temperature to 64° C. The reaction temperature was then raised to 100° C. and maintained thereat for a period of 5.5 hours during which time xylene was added in order to keep the polymer solution stirrable. The resulting pale-colored polymer solution had a viscosity of 10,080 centipoises at 25° C. and contained solvent to the extent of 59 weight percent.

Parkerized black iron panels were dip-coated from the polymer solution so as to give dried films which were from 0.8 to 1.0 mil thickness. The resulting films were allowed to air-dry for thirty minutes at room temperature and then baked for thirty minutes at 177° C. The properties of the films are listed below. Color stability to ultraviolet light data is contained in Example 12.

| Impact, in. lbs. | Sward Hardness | Chemical Resistance | |
|---|---|---|---|
| | | Boiling Water | Caustic |
| 108 | 56 | Excellent | Good |

EXAMPLE 7

Dehydrated castor oil acid (277 grams), pentaerythritol (68 grams) and xylene (35 grams) were charged to a four-necked flask fitted with an air-stirrer, a thermometer, a nitrogen purge line and a water-cooled stillhead. The polyol and acid were present in the proportions of two moles of acid per one mole of pentaerythritol. The resulting reaction mixture was heated to a temperature of 240° C. to 260° C. and maintained thereat for a period of 1.3 hours, during which time 13 grams of water were azeotroped from the reaction mixture with xylene. The resulting product had an acid number of 0.9 prior to cooling to room temperature.

The reaction mixture was allowed to cool to 80° C. and a catalyst solution comprising 2 grams of stannic chloride in 40 grams of xylene was added. 3,4-epoxy-6-methylcyclohexylmethyl 3,4-epoxy-6-methylcyclohexanecarboxylate (101 grams) was then added over a period of fifteen minutes during which time the reaction temperature increased to 100° C. The polymerization proceeded rapidly over a period of thirty-five minutes during which time 1677 grams of xylene were added to maintain adequate stirring. The reaction was continued at 100° C. for an additional 1.2 hours. The resulting varnish solution contained 18.6 percent polymer and had a viscosity of 2475 centipoises at 25° C.

A black iron panel was dip-coated with the polymer solution and allowed to air-dry for thirty minutes at room temperature followed by baking for thirty minutes at 160° C. The resulting glossy, colorless film was 1.5 mils thick, and was unaffected by scratching with a 9H hardness Double Eagle pencil and by bending 360 degress on a ⅛-inch mandrel.

EXAMPLES 8 AND 9

Bis(3,4-epoxy-6-methylcyclohexylmethyl) adipate (72 grams, Example 8) and diethylene glycol bis(3,4-epoxy-6-methylcyclohexanecarboxylate) (73 grams, Example 9), respectively, were each mixed with an adduct (118 grams) similar to that of Example 1 and heated to a temperature of 80° C. To the reaction mixture a catalyst solution comprising 0.8 gram of stannic chloride in 55 grams of xylene was added dropwise to each mixture over a period of thirty-five minutes. Additional xylene was added as the polymerizations progressed in order to maintain the solution viscosities at a stirrable level.

| Ex. No. | Polymerization time at 80° C., Hours | Properties of Polymer Solution | |
|---|---|---|---|
| | | Solids, Percent | Viscosity at 25° C., cps. |
| 8 | 1 | 41.8 | >100,000 |
| 9 | 0.8 | 37.5 | >100,000 |

Black iron panels were dip-coated from the polymer solutions, allowed to air-dry at room temperature for thirty minutes and then baked for thirty minutes at 160° C. The resulting films were glossy and colorless. The film from Example 8 was 1.5 mils thick, unaffected by scratching with a 9H hardness Double Eagle pencil, and was unaffected by bending 360 degrees around a ⅛-inch mandrel. The film from Example 9 was 0.5 mil thick, and was unaffected by bending 360 degrees on a ½-inch mandrel.

EXAMPLE 10

3,4-epoxy-6-methylcyclohexylmethyl 3,4-epoxy-6-methylcyclohexanecarboxylate (61 grams) of 91 percent purity and dehydrated castor oil acid (143 grams) were mixed in the proportions of 0.8 epoxide group per one carboxyl group. The resulting mixture was charged with xylene (30 grams) to a one-liter 4-necked flask fitted with an air stirrer, a thermometer, a nitrogen purge line, and a water-cooled stillhead. The reaction mixture was heated to a temperature of 240° C. and maintained thereat for three hours during which time water was removed from the stillhead as the lower layer of an azeotrope with xylene. The resulting viscous product had an acid number of 9.1. This product was allowed to cool to about 100° C. and a catalyst solution comprising 1.0 gram of stannic chloride in 19 grams of xylene was added over a period of about two minutes.

3,4-epoxy - 6 - methylcyclohexylmethyl 3,4-epoxy-6-methylcyclohexanecarboxylate (76 grams) was then added dropwise to the reaction mixture over a period of about 1.4 hours during which time the temperature was maintained between 100° C. and 130° C. After the diepoxide addition was completed, a second portion of catalyst solution comprising 0.5 gram of stannic chloride in 9.5 grams of xylene was added over about a one-minute period. The polymerization was allowed to continue at 118° C. to 124° C. for about forty-five minutes during which time 161 grams of xylene were added in order to maintain the viscosity of the polymer solution at a stirrable level. The resulting product contained 48.2 percent non-volatiles and had a viscosity of 300 centipoises at 25° C.

This example demonstrates that adducts of a diepoxide and an acid can be prepared under such conditions as to esterify some of the hydroxyl groups generated from the epoxide-carboxyl reaction thus allowing the preparation of hydroxyl-containing esters which have incorporated a higher weight percent of fatty acid. These adducts, while they presumably contain less than two hydroxyl groups per molecule, readily copolymerized with cyclohexene oxide derivatives to afford polymers having outstanding utility as protective coatings as illustrated by the following data.

Parkerized black iron panels were dip-coated with the polymer solution, diluted with enough xylene to give a dry film which was from 0.8 to 1.0 mil in thickness. The resulting coated panels were allowed to air-dry for fifteen to thirty minutes at room temperature and then were baked for thirty minutes at 177° C. in an electrically heated oven. The resulting films had the properties described below. Color stability (ultraviolet light) data is listed in Example 12.

| Impact, in./lbs. | Sward Hardness | Chemical Resistance | |
|---|---|---|---|
| | | Boiling Water | Caustic |
| 108 | 61 | Excellent | Good. |

EXAMPLE 11

3,4-epoxy-6-methylcyclohexylmethyl 3,4-epoxy-6-methylcyclohexanecarboxylate (154 grams) and dehydrated castor oil acid (203 grams) were mixed in the proportions of one epoxide group per 0.7 carboxyl group and charged to a one-liter 4-necked flask fitted with an air stirrer, a thermometer, a nitrogen purge line and a water-cooled condenser. The resulting mixture was heated to a temperature of 175° C. to 200° C. and maintained thereat for five hours. The resulting product had a viscosity of 55,000 centipoises at 25° C., an acid number of 1.0, and contained 0.2 milliequivalent of epoxide per gram.

The product (280 grams) was mixed with xylene (76 grams) and 3,4-epoxy-6-methylcyclohexylmethyl 3,4-epoxy-6-methylcyclohexanecarboxylate (49 grams) and heated to a temperature of 50° C. and thereto was added dropwise a catalyst solution comprising 1.0 gram of stannic chloride in 19 grams of ethyl acetate and 42 grams of xylene over a period of about thirty minutes. The reaction mixture was then raised to 100° C. to 116° C. and maintained thereat for about four hours during which time additional xylene was added as required to maintain the viscosity of the solution at a stirrable level. The resulting product contained 53 percent non-volatiles and had a vissocity of 3,525 centipoises at 25° C. Films were cast on panels and color stability to ultraviolet light was tested. The data is contained in Example 12.

EXAMPLE 12

This example illustrates the color stability of protective coatings based on cyclohexene oxide derivatives when exposed to ultraviolet light.

The varnishes tested were pigmented with titanium dioxide using a polymer (no volatiles) to pigment weight ratio of 3 to 2, respectively. Mixing of the pigment and varnish was accomplished by grinding the materials in a pebble mill for about twenty-four hours. Metal driers, cobalt naphthenate (0.05 percent as cobalt) and lead naphthenate (0.5 percent as lead), were then added and parkerized steel panels were dip-coated from the solutions so as to give a dry film thickness of from 1 to 2 mils. The resulting coated panels were air-dried for one week at room temperature and then exposed to ultraviolet light for two weeks. This exposure was carried out in a closed cabinet which was maintained at 60° C. with electrically heated, mechanically convected air. The test panels were placed three inches from two 40-watt (48 inches long) Westinghouse fluorescent-type sunlamps.

For the purpose of comparison (control) a commercial epoxy-type varnish was also tested. The varnish was prepared by esterifying a polymeric glycidyl ether of bisphenol A (60 parts) with dehydrated castor oil acid (40 parts) at 25° C. to 250° C. for about four hours. The glycidyl ether employed had a molecular weight of between 1,800 and 2,000. The resulting varnish had the following properties:

Non-volatiles _____ 49–51%
Solvent _____ Xylene.
Viscosity (Gardner-Holdt)_____ T–V.
Acid number, maximum_____ 3.

The comparison data of the varnishes of this invention and the control are as follows:

| Varnish from Example No.— | Color Change After Two Weeks' Exposure to UV |
|---|---|
| 6 | None. |
| 10 | Do. |
| 11 | Do. |
| Control | Severe yellowing after four days. |

EXAMPLE 13

This example illustrates the preparation of a copolymer of ethylene glycol and 3,4-epoxy-6-methylcyclohexylmethyl 3,4-epoxy-6-methylcyclohexanecarboxylate, and the esterification of the copolymer with dehydrated castor oil acid.

Ethylene glycol (45 grams), toluene (400 grams) and stannic chloride (2.4 grams) were charged to a reaction flask fitted with an air stirrer, a thermometer, and a dropping funnel. The resulting mixture was heated to 100° C. and 3,4-epoxy-6-methylcyclohexylmethyl 3,4-epoxy-6-methylcyclohexanecarboxylate (290 grams) (a hydroxyl-epoxide ratio of 0.74) was added dropwise over a period of fifty-five minutes. After the reaction mixture was allowed to cool to about 70° C., ice water was added to the reaction mixture with stirring, and a heterogeneous polymer-solvent-water mixture was formed. The liquid portion was decanted into a separating funnel and the remaining solid polymer phase was dissolved in cyclohexanone (600 grams) and added to the decanted material. The resulting mixture was shaken with additional water and allowed to stand overnight at room temperature after which time the polymer solution phase (984 grams) was removed and placed in a two-liter resin flask fitted with a distillation head, a vacuum pump and a heating mantle. The solvent (cyclohexanone and toluene) was removed by heating to 80° C. to 97° C. under vacuum. On cooling there was obtained 303 grams of a glassy solid which was removed and pulverized. The pulverized powder was further dried in a vacuum desiccator at room temperature.

One hundred grams of this product was mixed with 67 grams of dehydrated castor oil acid and 20 grams of xylene in a flask fitted with a stirrer, a nitrogen purge line, a thermometer, a distillation head, and a heating mantle. The mixture was heated to 245° C. and maintained thereat for two hours during which time the water formed from esterification was removed at the stillhead as an azeotrope with xylene. The reaction mixture was allowed to cool to 130° C., and 50 grams of xylene were added to afford a varnish solution having about 75 percent nonvolatiles. This amber-colored varnish had a viscosity of 1944 centipoises at 25° C.

One hundred grams of the varnish solution were diluted with 15 grams of xylene to give a solution viscosity at 25° C. of 492 centipoises. About 0.01 percent cobalt drier, in the form of cobalt naphthenate, was then added to the varnish solution.

A black iron panel was dipped in the resulting varnish solution and allowed to air-dry for thirty minutes and subsequently baked at 160° C. for thirty minutes. There was obtained a clear, tough, hard film which was unaffected when the panel was bent 180 degrees around a ⅛-inch mandrel.

EXAMPLE 14

3,4-epoxycyclohexylmethanol (47 grams) and dehydrated castor oil acid (76 grams) were mixed in the proportions of one epoxide group per 0.8 carboxyl group and heated to a temperature of 200° C. to 230° C. for a period of 12.3 hours. After cooling, the resulting pale-yellow reaction mixture had an acid number of 5.0, a viscosity of 625 centipoises at 25° C., and no residual epoxy groups.

The reaction mixture (75 grams) and 3,4-epoxy-6-methylcyclohexylmethyl 3,4-epoxy-6-methylcyclohexanecarboxylate (45 grams) were mixed in the proportions (theoretical) of one epoxide group per 1.2 hydroxyl groups. Xylene (13 grams) was then added and a catalyst solution comprising boron trifluoroide etherate (0.5 gram) and xylene (31 grams) was fed dropwise to the mixture over a period of 1.5 hours while the temperature was maintained between 20° C. to 30° C. About 100 milliliters of xylene were added in 25 milliliter portions over a period of thirty minutes after the catalyst was added to maintain the viscosity of the polymer solution at a stirrable level.

The resulting product contained 46.5 percent nonvolatiles and had a viscosity of 625 centipoises at 25° C. About one gram of the product was weighed into an aluminum weighing dish and heated at 160° C. for fifteen minutes. There was obtained a colorless, clear, hard, tough film which adhered tenaciously to the aluminum weighing dish.

EXAMPLE 15

3,4-epoxy-6-methylcyclohexylmethyl 3,4-epoxy-6-methylcyclohexanecarboxylate (39 grams) and oleyl alcohol [1] (84 grams) were mixed in the proportion of one epoxide group to 1.2 hydroxyl groups. To the resulting mixture there was added dropwise over a period of twenty-five minutes a catalyst solution of boron trifluoride etherate

[1] "Adol 32" obtained from the Archer-Daniels-Midland Company, Minneapolis, Minnesota.

(1.54 grams) and xylene (50 grams) during which time the reaction temperature was maintained between 20° C. and 30° C. by cooling with a wet-ice bath. The reaction was allowed to continue at room temperature for an additional hour at which time an epoxide analysis indicated the reaction was completed.

The resulting product solution was then heated to a temperature of 45° C. to 50° C. under vacuum in order to remove the xylene solvent. The residue was an amber-colored liquid which had a viscosity of 1,560 centipoises at 25° C.

3,4-epoxy-6-methylcyclohexylmethyl 3,4-epoxy-6-methylcyclohexanecarboxylate (14 grams) and the above-described adduct product mixture (100 grams) were mixed in the proportion of one epoxide group per 1.2 hydroxyl groups. Since the boron trifluoride etherate catalyst used for preparing the adduct product mixture was still present, the copolymerization of the adduct and 3,4-epoxy-6-methylcyclohexylmethyl 3,4-epoxy-6-methylcyclohexanecarboxylate occurred as soon as the two were mixed and cooling was required to maintain the temperature between 20° C. and 30° C. After reacting for ten minutes, the polymerization mixture was extremely viscous and xylene (14 grams) was added to maintain the viscosity at a stirrable level. After a total of 1.5 hours at 20° C. to 30° C., a solution comprising 3,4-epoxy-6-methylcyclohexylmethyl 3,4-epoxy-6-methylcyclohexanecarboxylate (18 grams) and xylene (18 grams) was fed dropwise to the polymerization mixture over a period of forty minutes and after allowing the polymerization to continue for an additional fifteen minutes an epoxide analysis indicated the polymerization was essentially completed. The resulting polymer solution contained 77.3 percent non-volatiles and had a viscosity of 5,000 centipoises at 25° C.

In order to obtain an even higher molecular weight the polymer solution (111 grams) was treated by adding xylene (10 grams) and a solution of 3,4-epoxy-6-methylcyclohexylmethyl 3,4-epoxy-6-methylcyclohexanecarboxylate (5 grams) and xylene (5 grams) over a period of about ten minutes. This treatment was then repeated twice using 3,4-epoxy-6-methylcyclohexylmethyl 3,4-epoxy-6-methylcyclohexanecarboxylate (2.8 grams) and xylene (9 grams), a total of 5.6 grams of 3,4-epoxy-6-methylcyclohexylmethyl 3,4-epoxy-6-methylcyclohexanecarboxylate and 18 grams of xylene, to give a polymer solution containing about 65 percent non-volatiles and having a viscosity of 1,325 centipoises at room temperature. Fifty grams of this solution were diluted with four grams of xylene and 0.3 gram of a solution containing six weight percent of cobalt in the form of cobalt naphthenate was added. A black iron panel was then dipped into the polymer solution and the resulting coating was allowed to air-dry for fifteen minutes and was given a final cure of thirty minutes at 160° C. There was obtained a clear, colorless, tough film which remained intact after bending the panel 180 degrees around a ⅛-inch mandrel.

What is claimed is:

1. A method of protecting a surface for exposure to outdoor weather conditions which comprises applying to the surface as a coating a polymerizable composition dissolved in an inert solvent said polymerizable composition comprising (1) a polyepoxide containing between two and about eight cyclohexene oxide groups, and (2) a partial fatty ester of pentaerythritol having at least two free hydroxyl groups, said ester being present in an amount providing between about 0.8 and 1.5 hydroxyl equivalents per epoxy equivalent of said polyepoxide; and drying the coating at a temperature between 20° C. and 200° C. for a period of time sufficient to produce a hard tough flexible film on said surface.

2. A method of protecting a surface for exposure to outdoor weather conditions which comprises applying to the surface as a coating a polymerizable composition dissolved in an inert solvent said polymerizable composition comprising (1) a polyepoxide containing between two and about eight cyclohexene oxide groups and (2) a partial fatty ester of glycerol having two free hydroxyl groups, said ester being present in an amount providing between about 0.8 and 1.5 hydroxyl equivalents per epoxy equivalent of said polyepoxide; and drying the coating at a temperature between 20° C. and 200° C. for a period of time sufficient to produce a hard tough flexible film on said surface.

References Cited in the file of this patent

UNITED STATES PATENTS

| | | |
|---|---|---|
| 2,700,030 | Widmer et al. | Jan. 18, 1955 |
| 2,785,383 | Foster | Mar. 12, 1957 |
| 2,890,194 | Phillips et al. | June 9, 1959 |
| 2,890,195 | Phillips et al. | June 9, 1959 |
| 2,890,196 | Phillips et al. | June 9, 1959 |
| 2,890,197 | Phillips et al. | June 9, 1959 |